(12) United States Patent
Yang

(10) Patent No.: US 7,597,366 B2
(45) Date of Patent: Oct. 6, 2009

(54) CLAMP MECHANISM

(75) Inventor: Chih-Rong Yang, Taipei Hsien (TW)

(73) Assignee: Giga-Byte Technology Co., Ltd., Tapei Hsien (TW)

( * ) Notice: Subject to any disclaimer, the term of this patent is extended or adjusted under 35 U.S.C. 154(b) by 349 days.

(21) Appl. No.: 11/699,013

(22) Filed: Jan. 29, 2007

(65) Prior Publication Data

US 2008/0179899 A1    Jul. 31, 2008

(51) Int. Cl.
*B65D 45/00* (2006.01)
*E05C 19/18* (2006.01)

(52) U.S. Cl. .................. 292/256; 292/258; 292/288; 292/292; 292/DIG. 60; 24/523; 24/568; 248/229.12; 248/229.22

(58) Field of Classification Search .............. 292/80, 292/256, 258, 288, 292, 302, DIG. 60; 248/229.12, 248/229.22, 313, 316.4; 24/522–524, 568
See application file for complete search history.

(56) References Cited

U.S. PATENT DOCUMENTS

| | | | | |
|---|---|---|---|---|
| 1,288,112 A | * | 12/1918 | Minnis | 269/98 |
| 1,409,650 A | * | 3/1922 | Beedham | 81/3.32 |
| 3,834,746 A | * | 9/1974 | Hinden | 292/290 |
| 6,370,741 B1 | * | 4/2002 | Lu | 24/523 |
| 6,604,764 B2 | * | 8/2003 | Zemzik | 292/293 |
| 6,802,483 B1 | * | 10/2004 | Leasure | 248/229.15 |
| 7,093,811 B2 | * | 8/2006 | Wu | 248/229.12 |
| 7,389,964 B2 | * | 6/2008 | Ye | 248/231.61 |
| 2005/0279902 A1 | * | 12/2005 | Richter | 248/316.4 |

* cited by examiner

*Primary Examiner*—Carlos Lugo
(74) *Attorney, Agent, or Firm*—Birch, Stewart, Kolasch & Birch, LLP

(57) ABSTRACT

A clamp mechanism clamping an electronic device and connecting an object to the electronic device is provided. The mechanism includes a first clamping element, a second clamping element slidably joined to the first clamping element in a joint position to adjust the second clamping element apart from the first clamping element to a clamp distance, a latching element inserted into the joint position to maintain the first clamping element apart from the second clamping element at the clamp distance, and a connecting element joined to the second clamping element and connected to the object.

11 Claims, 8 Drawing Sheets

CLAMP MECHANISM

BACKGROUND OF THE INVENTION

1. Field of the Invention

The invention relates to a clamp mechanism, and more particularly to a clamp mechanism clamping an electronic device and connecting an object to the electronic device.

2. Description of the Related Art

In general, an object, such as protective glass, is attached to a display device via adhesive. The adhesive, however, when used to attach heavy objects is susceptible to failure after a period of use, causing the object fall.

BRIEF SUMMARY OF THE INVENTION

Clamp mechanisms are provided. An exemplary embodiment of a clamp mechanism capable of clamping an electronic device and connecting an object to the electronic device comprises a first clamping element, a second clamping element slidably joined to the first clamping element in a joint position to adjust the second clamping element apart from the first clamping element to a clamp distance, a latching element inserted into the joint position to maintain the first clamping element apart from the second clamping element at the clamp distance, and a connecting element joined to the second clamping element and connected to the object.

The first clamping element comprises a first joining portion slidably joined to the second clamping element, and a first clamping portion connected to the first joining portion. The electronic device is clamped between the first clamping portion and the second clamping element.

The second clamping element comprises a second joining portion slidably joined to the first joining portion, and a second clamping portion connected to the second joining portion. The distance between the first clamping portion and the second clamping portion is adjusted to the clamp distance by moving the first and second joining portions to clamp the electronic device.

The first joining portion is connected to the first clamping portion to be an L-shape. The second joining portion is connected to the second clamping portion to be an L-shape.

The first joining portion has a first flange. The second joining portion has a first channel with which the first flange slidably engages, whereby the first clamping element is slidably joined to the second clamping element.

The first joining portion comprises an arm having a protrusion on one side and a notch on another side. The second joining portion comprises a groove having a plurality of concave portions on lateral walls thereof. When the arm slides in the groove, the protrusion engages one of the concave portions and the latching element is inserted into the notch to fix the protrusion in the concave portion, whereby the first joining portion is fixed to the second joining portion to maintain the clamp distance.

The latching element comprises a connecting body rotatably connected to the first joining portion and a latch connected to the connecting body. When the connecting body is parallel to the first joining portion, the latch is inserted into the notch to fix the protrusion in the concave portion.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
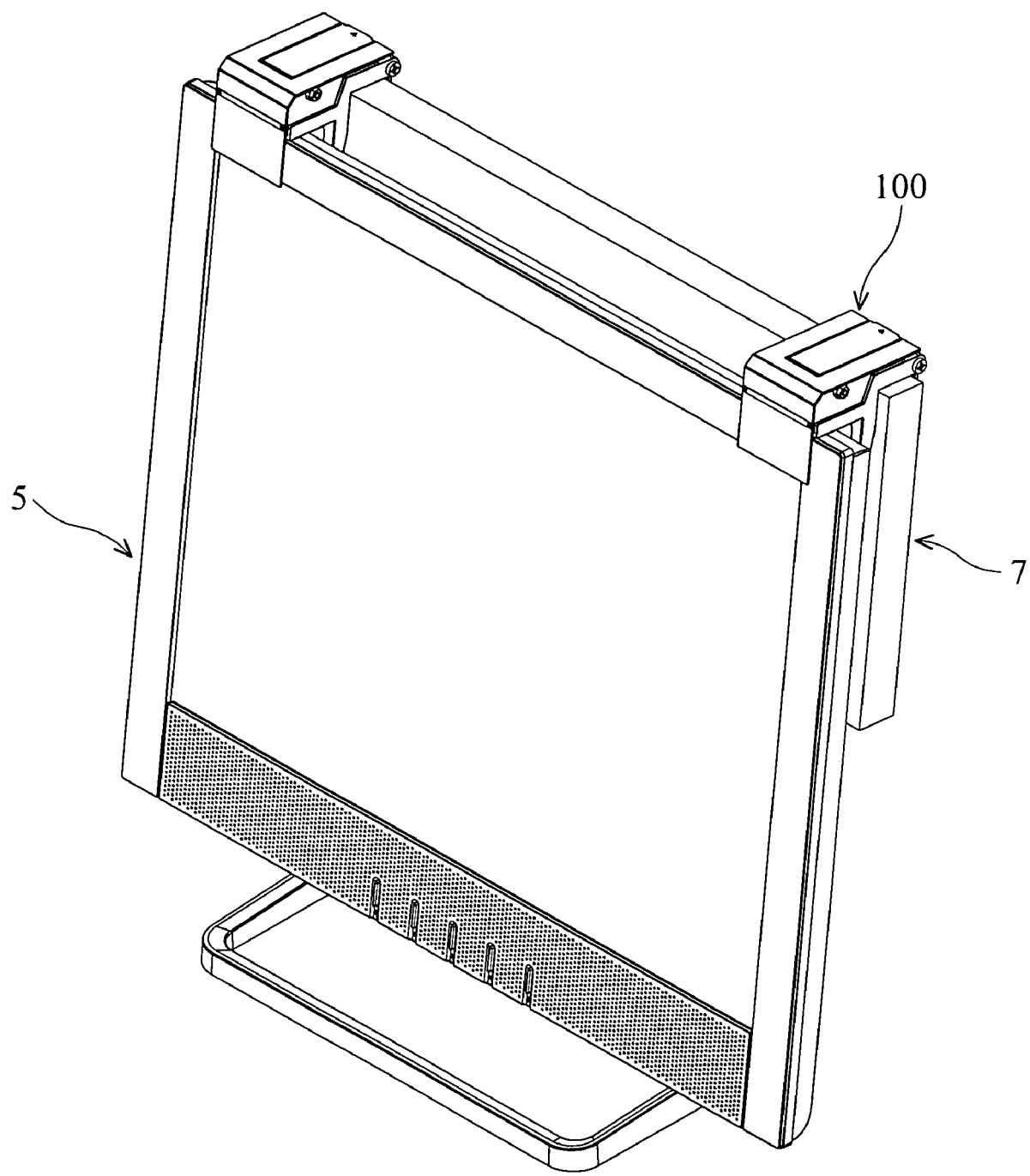
FIG. 1 is a perspective view of a clamp mechanism of the invention for a display device.

Referring to FIG. 1, a clamp mechanism 100 clamps the top of a display device 5, and an object 7 is connected to the clamp mechanism 100, thus the object 7 can be hung on the display device 5. The object 7 can be a computer or digital TV broadcast box. Although the clamp mechanism is applied to a display device in this embodiment, the invention is not limited thereto; the clamp mechanism can also applied to other electronic devices.

Figure 2:
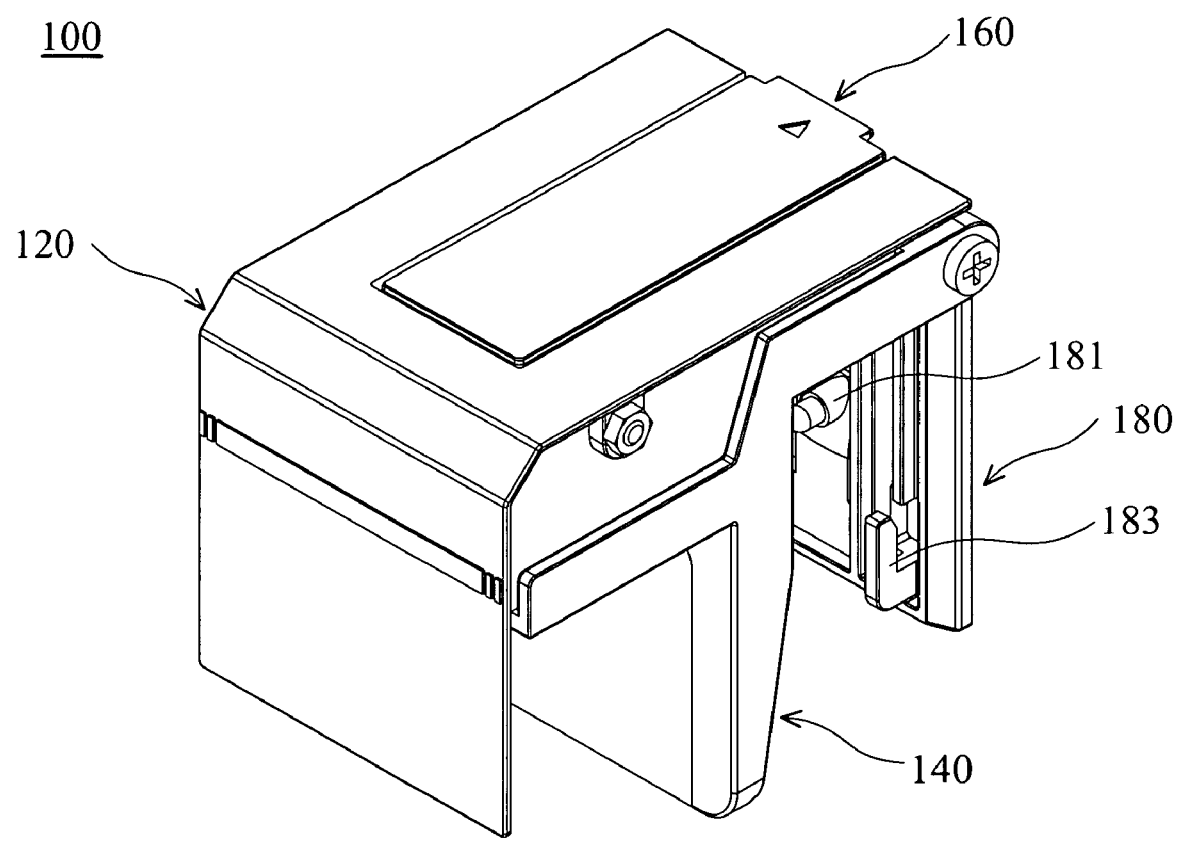
FIG. 2 is a perspective view of the clamp mechanism of the invention.

Referring to FIG. 2, the clamp mechanism 100 comprises a first clamping element 120, a second clamping element 140, a latching element 160 and a connecting element 180. The display device 5 is clamped between the first element 120 and the second element 140. The object 7 is joined to a connecting portion 181 or 183 of the connecting element 180 and held between the second clamping element 140 and the connecting element 180. The first clamping element 120 is slidably joined to the second clamping element 140. The latching element 160 constrains sliding between the first and second clamping elements 120 and 140, whereby a clamp distance is maintained therebetween to clamp the display device 5.

Figure 3:
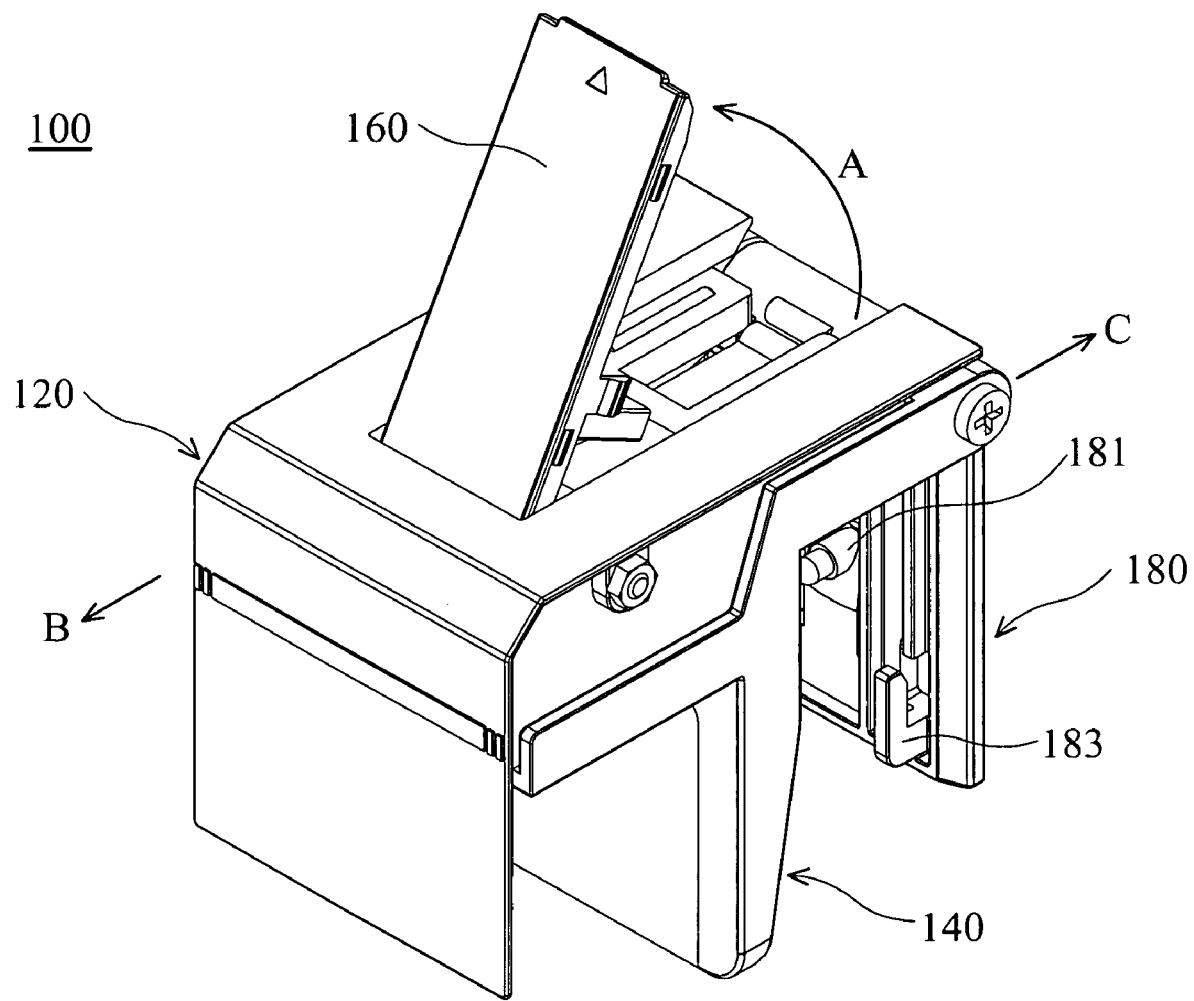
FIG. 3 is another perspective view of the clamp mechanism of the invention.
Figure 4:
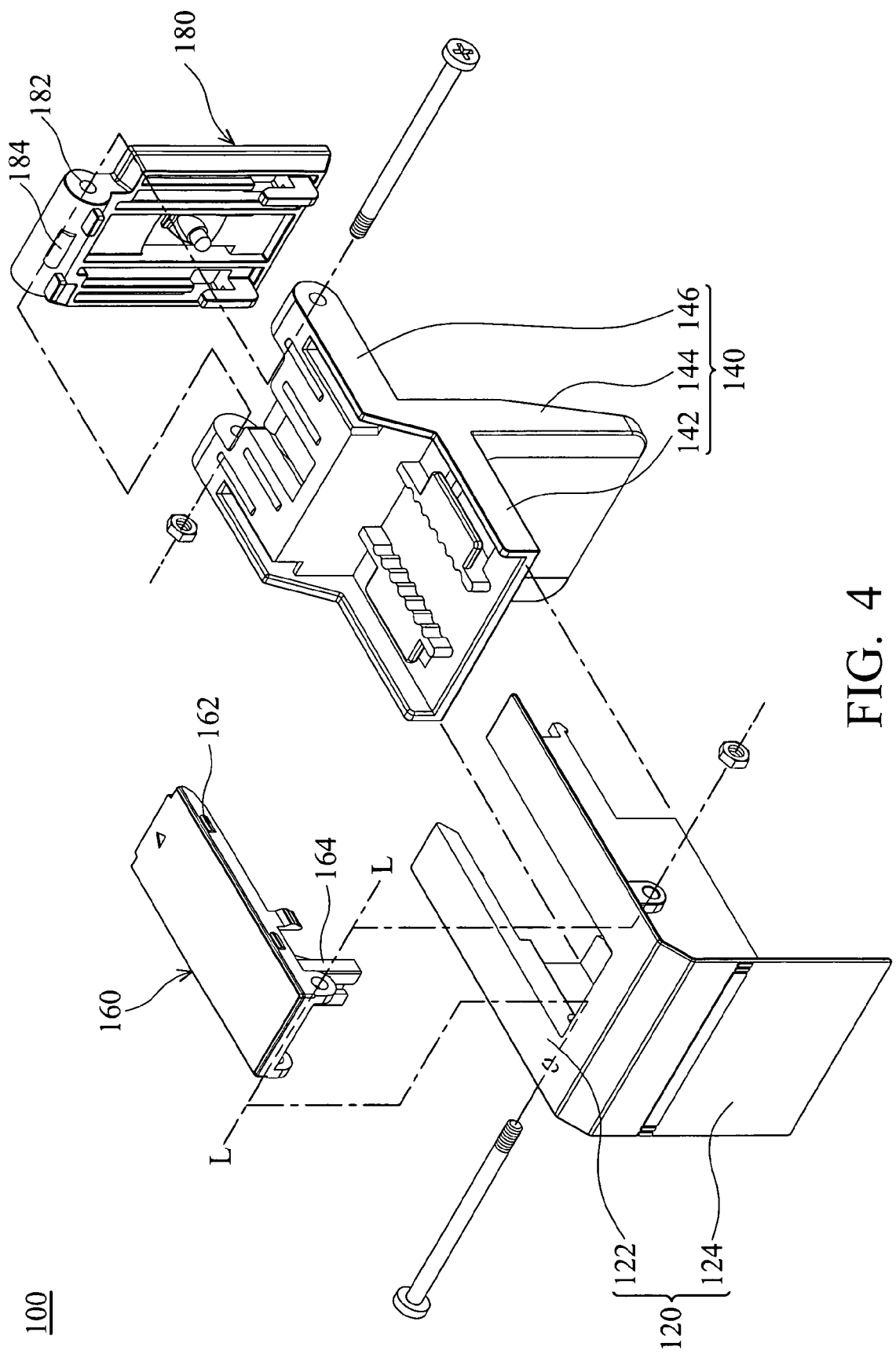
FIG. 4 is an exploded view of the clamp mechanism of the invention.

Referring to FIGS. 3 and 4, the latching element 160 is rotatably connected to the first clamping element 120 and rotates about an axis L. When the latching element 160 is lifted in direction A, the first clamping element 120 and the second clamping element 140 can move in directions B and C respectively, whereby the clamp distance between the first and second clamping element 120 and 140 is changed according to the width or thickness of the display device 5. When the latching element 160 is closed (the latching element 160 parallel to a first joining portion 122 of the first clamping element 120), the latching element 160 constrains the slide between the first clamping element 120 and the second clamping element 140.

The first clamping element 120 comprises a first joining portion 122 and a first clamping portion 124. The second clamping element 140 comprises a second joining portion 142, a second clamping portion 144 and an extension portion 146. The first joining portion 122 is slidably joined to the second joining portion 142. The first clamping portion 124 is connected to the first joining portion 122 to be an L shape. Similarly, the second clamping portion 144 is connected to the second joining portion 142 to be an L shape, whereby the first clamping element 120 is joined to the second clamping element 140 to be an U shape which can clamp the display device 5. The latching element 160 comprises a connecting body 162 and a latch 164. The latch 164 has a post-shape, and the connecting element 180 is rotatably connected to the extension portion 146 and can rotate about an axis 182.

Figure 5:
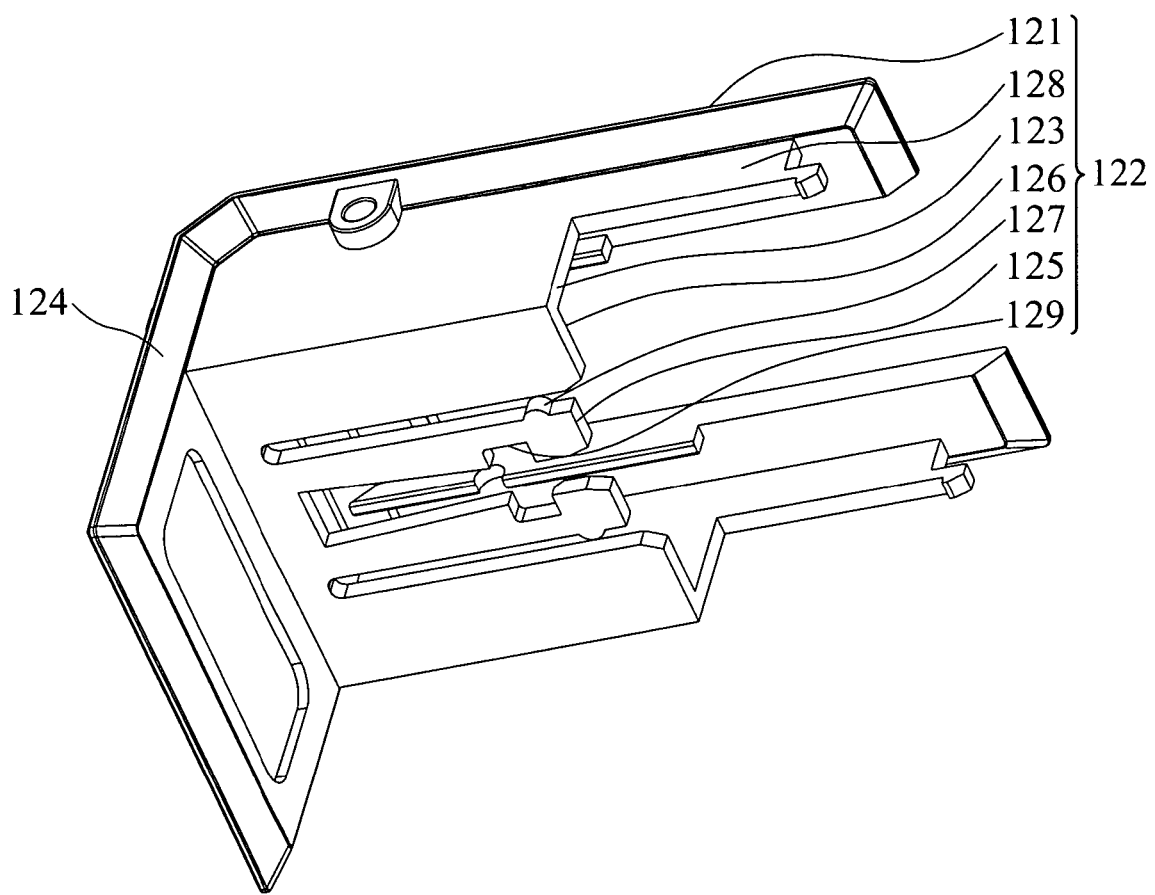
FIG. 5 is a perspective view of the first clamping element of the invention.

Referring to FIG. 5, the first clamping element 120 comprises the first joining portion 122 and the first clamping portion 124. The first joining portion 122 comprises a top 121 and two lateral walls 123 extending from the top 121 to the first clamping portion 124. Two first flanges 126 extend inward from one side of the lateral walls 123 respectively in opposite directions and configure to be an L shape with the lateral wall 123. Two arms 125 extend from the first clamping portion 124 and near the first flanges 126. Each arm 125 has a protrusion 127 on the outer side thereof and a notch 129 on the inner side thereof. Two second flanges 128 extend forward from the lateral wall 123.

Figure 6:
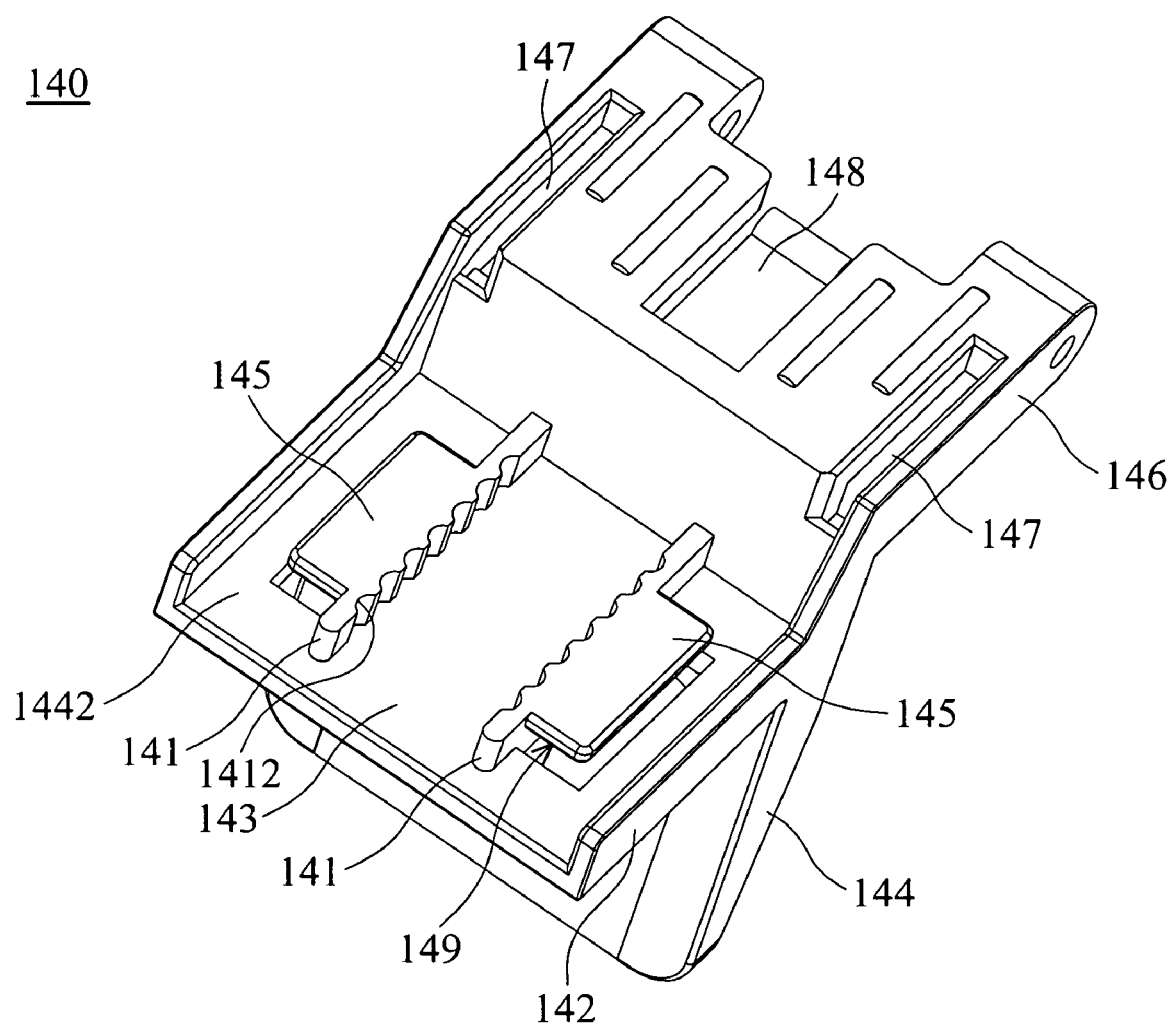
FIG. 6 is a perspective view of the second clamping element of the invention.
Figure 7:
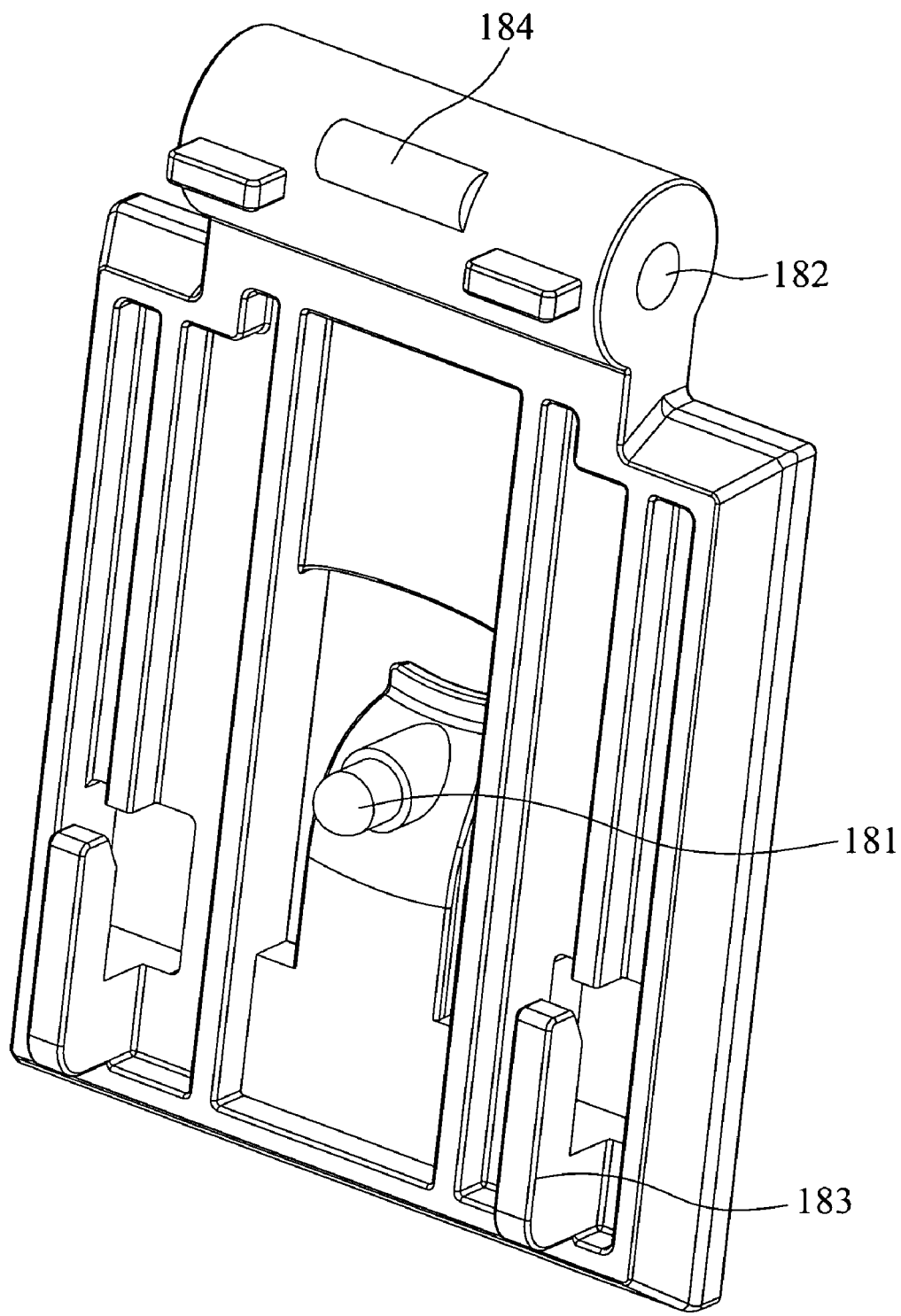
FIG. 7 is a perspective view of the connecting element of the invention.

Referring to FIG. 6, the second clamping element 140 comprises the second joining portion 142, the second clamping portion 144 and the extension portion 146. The second joining portion 144 comprises a top 1442. Two ribs 141 are disposed on the top 1442. A groove 143 is formed by the ribs 141. A plurality of concave portions 1412 is formed on the rib 141. Two wings 145 extend from the outer side of the ribs 141, whereby a first channel 149 corresponding to the first flange 126 is formed between the wing 145 and the top 1442. Two second channels 147 corresponding to the second flange 128 are formed on the extension portion 146. A finger 148 is disposed on the central portion of the extension portion 146.

Figure 8:
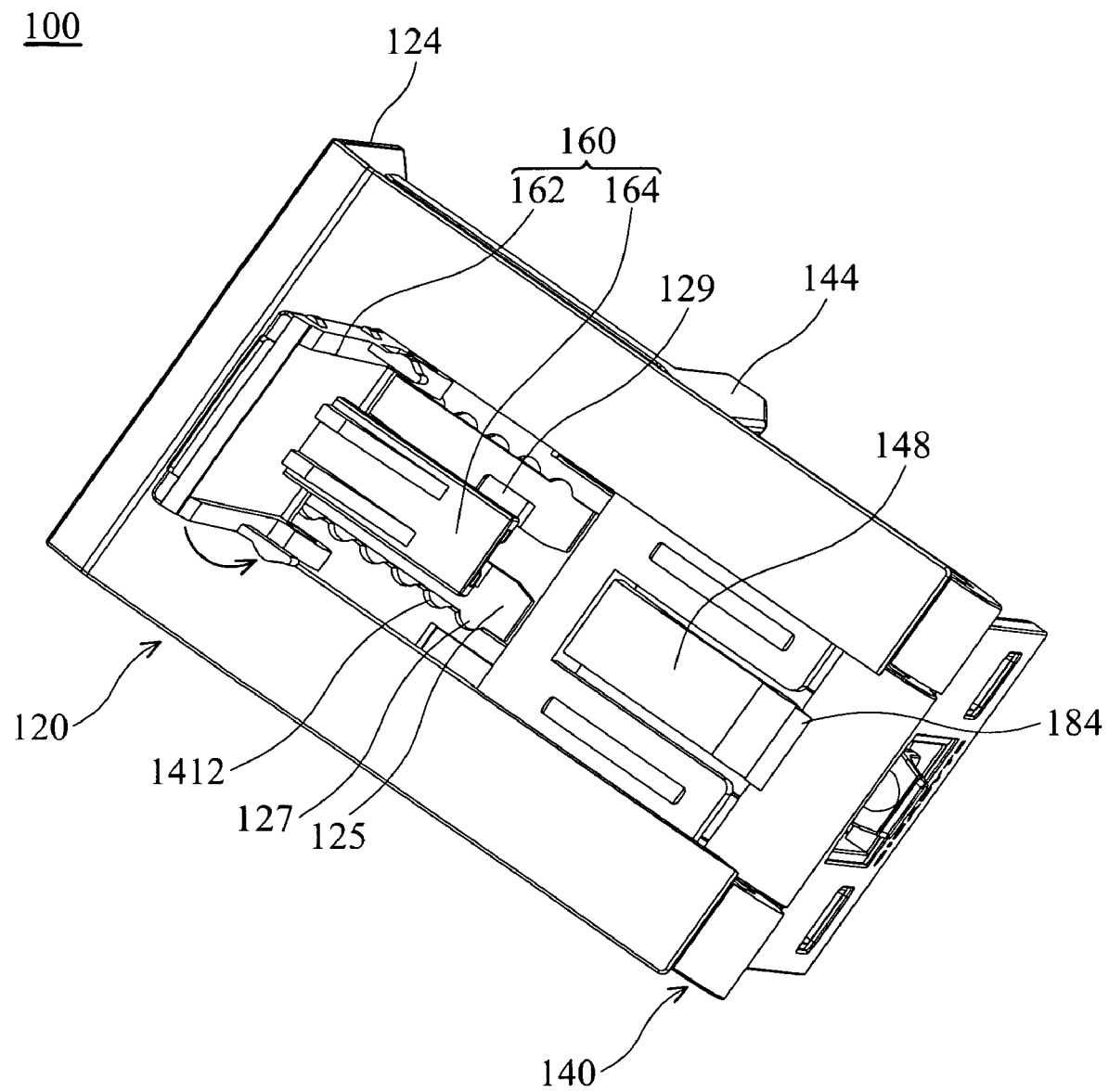
FIG. 8 is another perspective view of the clamp mechanism of the invention.

Referring to FIG. 8, the connecting element 180 is rotatably connected to the extension portion 146 and can rotate about the shaft 182. A block 184 corresponding to the finger 148 of the second clamping element 140 is disposed on the shaft 182.

Referring again to FIGS. 5 and 6, when the first clamping element 120 is joined to the second clamping element 140, the first flange 126 enters the first channel 149 and the second flange 128 enters the second channel 147, whereby the first joining portion 122 is slidably joined to the second joining portion 142 and the distance between the first clamping portion 124 and the second clamping portion 144 is adjusted to the clamp distance. Referring to FIG. 8, the arms 125 enters the groove 143 with the protrusion 127 engaging one of the concave portions 1412. As the arm 125 can deform slightly, the protrusion 127 can enter and leave the concave portions 1412. When the first clamping element 120 moves to an appropriate position, the latching element 160 is rotated to engage the latch 164 with the notch 129, whereby the arm 125 cannot deform and fixed in the concave portion 1412, whereby the slide between the first and second joining portions 122 and 142 are constrained and a clamp distance is maintained between the first and second clamping portions 124 and 144.

The block 184 abuts the finger 148 to limit the connecting element 180 to a first position. When the connecting element 180 rotates, the block 184 pushes the finger 148 and moves across a limit position, whereby the connecting element 180 can rotate freely. When the clamp mechanism 100 clamps a display device with a convex portion on the back, the object 7 connected to the connecting element 180 can rotate according to the convex shape and maintain the connection.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clamp mechanism clamping an electronic device and joining an object to the electronic device, comprising a first clamping element having a first joining portion;

a second clamping element having a second joining portion slidably joined to the first joining portion in a joint position to adjust the second clamping element apart from the first clamping element to a clamp distance;

a latching element comprising a connecting body rotatably connected to the first joining portion and a latch connected to the connecting body, and inserted into the joint position to maintain the first clamping element apart from the second clamping element at the clamp distance; and a connecting element joined to the second clamping element and connected to the object, whereby the object is joined to the electronic device, wherein the first joining portion comprises two arms having a protrusion on one side and a notch on another side, and the second joining portion comprises a groove having a plurality of concave portions on lateral walls thereof, wherein when the arms slide in the groove, the protrusion engages one of the concave portions and the latching element is inserted into the notch to fix the protrusion in the concave portions whereby the first joining portion is fixed to the second joining portion to maintain the clamp distance, and when the connecting body is parallel to the first joining portion, the latch is inserted into the notch to fix the protrusion in the concave portion.

2. The clamp mechanism as claimed in claim 1, wherein the first clamping element comprises:

a first clamping portion connected to the first joining portion, wherein the electronic device is clamped between the first clamping portion and the second clamping element.

3. The clamp mechanism as claimed in claim 2, wherein the second clamping element comprises:

a second clamping portion connected to the second joining portion, wherein the distance between the first clamping portion and the second clamping portion is adjusted to the clamp distance by moving the first and second joining portions to clamp the electronic device.

4. The clamp mechanism as claimed in claim 3, wherein the first joining portion is connected to the first clamping portion to be an L-shape, and the second joining portion is connected to the second clamping portion to be an L-shape.

5. The clamp mechanism as claimed in claim 3, wherein the first joining portion has a first flange, and the second joining portion has a first channel with which the first flange slidably engages, whereby the first clamping element is slidably joined to the second clamping element.

6. The clamp mechanism as claimed in claim 5, wherein the arm is parallel to the first flange and the groove is parallel to the first channel.

7. The clamp mechanism as claimed in claim 5, wherein the second clamping element has an extension portion extending in a direction opposite to the joint position.

8. The clamp mechanism as claimed in claim 5, wherein the first joining portion further comprises a second flange extending from the first flange, and the extension portion has a second channel with which the second flange engages.

9. The clamp mechanism as claimed in claim 1, wherein the latch has a post-shape which is substantially conformal with the shape of the notch.

10. The clamp mechanism as claimed in claim 1, wherein the second clamping element has an extension portion extending in a direction opposite to the joint position, and the connecting element is rotatably connected to the extension portion and comprises a shaft.

11. The clamp mechanism as claimed in claim 10, wherein the extension portion comprises a finger, and the connecting element comprises a block disposed on the shaft, and the finger abuts the block to constrain the connecting element to a first position, and when the connecting element rotates, the block pushes and releases the finger.

* * * * *